US012572880B2

(12) United States Patent
Sun et al.

(10) Patent No.: US 12,572,880 B2
(45) Date of Patent: Mar. 10, 2026

(54) METHOD AND DEVICE FOR CONTROLLING A TRANSPORT SYSTEM TO PERFORM TRANSPORT TASKS

(71) Applicant: GRABTAXI HOLDINGS PTE. LTD., Singapore (SG)

(72) Inventors: Chang Sun, Singapore (SG); Junpeng Niu, Singapore (SG); Larry Jun Jie Lin, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/698,232

(22) PCT Filed: Nov. 4, 2022

(86) PCT No.: PCT/SG2022/050803
§ 371 (c)(1),
(2) Date: Apr. 3, 2024

(87) PCT Pub. No.: WO2023/086020
PCT Pub. Date: May 19, 2023

(65) Prior Publication Data
US 2024/0412149 A1 Dec. 12, 2024

(30) Foreign Application Priority Data
Nov. 9, 2021 (SG) ............................ 10202112426V

(51) Int. Cl.
*G06Q 10/08* (2024.01)
*G06Q 10/06* (2023.01)
(52) U.S. Cl.
CPC ............. *G06Q 10/08* (2013.01); *G06Q 10/06* (2013.01)
(58) Field of Classification Search
CPC ............................... G06Q 10/08; G06Q 10/06
(Continued)

(56) References Cited

U.S. PATENT DOCUMENTS 10,664,915 B1 5/2020 Copeland et al.
12,086,897 B2 * 9/2024 Luo .................. G06Q 10/06313

FOREIGN PATENT DOCUMENTS

WO 2021016267 A1 1/2021

OTHER PUBLICATIONS

"Automation of Task Processes: An Exampleof Intelligent Transportation Systems" Published by Human Factors and Ergonomics in Manufacturing (Year: 2000).*
(Continued)

*Primary Examiner* — Zeina Elchanti
(74) *Attorney, Agent, or Firm* — BUCKLEY, MASCHOFF & TALWALKAR, LLC

(57) ABSTRACT

Aspects concern a. method for controlling a transport system comprising determining, for first score adjustment vectors, allocation rates, fulfilment rates and gains of fulfilled predetermined transport tasks. The method further comprises determining a second score adjustment vector from the allocation rates, fulfilment rates and gains determined for the first score adjustment vectors by estimating the second score adjustment vector to maximize a gain of fulfilled requested transport tasks subject to a predetermined minimum allocation rate of requested, transport tasks of each transport task category and a predetermined minimum fulfilment rate of requested transport tasks of each transport task category. Additionally, the method comprises controlling the transport system to perform transport tasks of a set of requested transport tasks by determining scores for each requested transport task, adjusting the scores of each transport task according to the second score adjustment vector and prioritizing requested transport tasks depending on their adjusted scores.

18 Claims, 5 Drawing Sheets

(58) Field of Classification Search
USPC .......................................................... 705/332
See application file for complete search history.

(56) References Cited

OTHER PUBLICATIONS

International Search Report and Written Opinion dated Jun. 2, 2023 which was issued in connection with PCT/SG2022/050803.

Korein M. et al., Multi-Armed Bandit Algorithms for a Mobile Service Robot's Spare Time in a Structured Environment. GCAI-2018. 4th Global Conference on Artificial Intelligence, Sep. 17, 2018, vol. 55, pp. 121-133 [Retrieved on May 17, 2023] <DOI: /10.29007/KG4R> 3 Problem Description, 4 Algorithms, 4.1 Naive Thompson Sampling and Naive UCB1, 4.2 Planning Thompson Sampling and Planning UCB1, 5.2 Performance Metrics, 5.4 Star Results.

From Multiarmed Bandits to Stochastic Optimization. May 24, 2018 [Retrieved on May 17, 2023 from https://www.erim.eur.nl/fileadmin/user_upload/ Powell_FromBanditToStochasticOptimization_Rotterdam_May252018.pdf] Whole document.

Automating Multi-Armed Bandit testing during feature rollout. Sep. 1, 2021 [Retrieved on May 17, 2023 from https://engineering.grab.com/multi-armed-bandit-system-recommendation] Whole document.

Emtehani et al.: "A joint inventory-finance model for coordinating a capital-constrained supply chain with financing limitations", Financial Innovation, 2021.

Chia-Hsien Su: "An Integrated Supplier-Buyer Inventory Model with Conditionally Free Shipment under Permissible Delay in Payments", Department of Business Administration, Tungnan University, ShenKeng Taipei Taiwan, Mar. 3, 2010.

Deng et al.: "Collaborative multicenter logistics delivery network optimization with resource sharing", PLoS One 15 (11): e0242555. https://doi.org/10.1371/journal.pone.0242555 (2020).

San-Jose et al.: "Profit maximization in an inventory system with time-varying demand, partial backordering and discrete inventory cycle" Annals of Operations Research, https://doi.org/10.1007/s10479-021-04161-6, Jun. 9, 2021.

Feldmann et al.: "Pushing manufacturing productivity to the max", [Retrieved https://www.mckinsey.com/business-functions/operations/our-insights/pushing-manufacturing-productivity-to-the-max], Article Mar. 15, 2017.

Wang et al.: "The Common Warehouse Model and Profit Distribution of the Express Industry", Algorithms 2021, 14, 50. https://doi.org/10.3390/a14020050.

* cited by examiner

Figure 4:
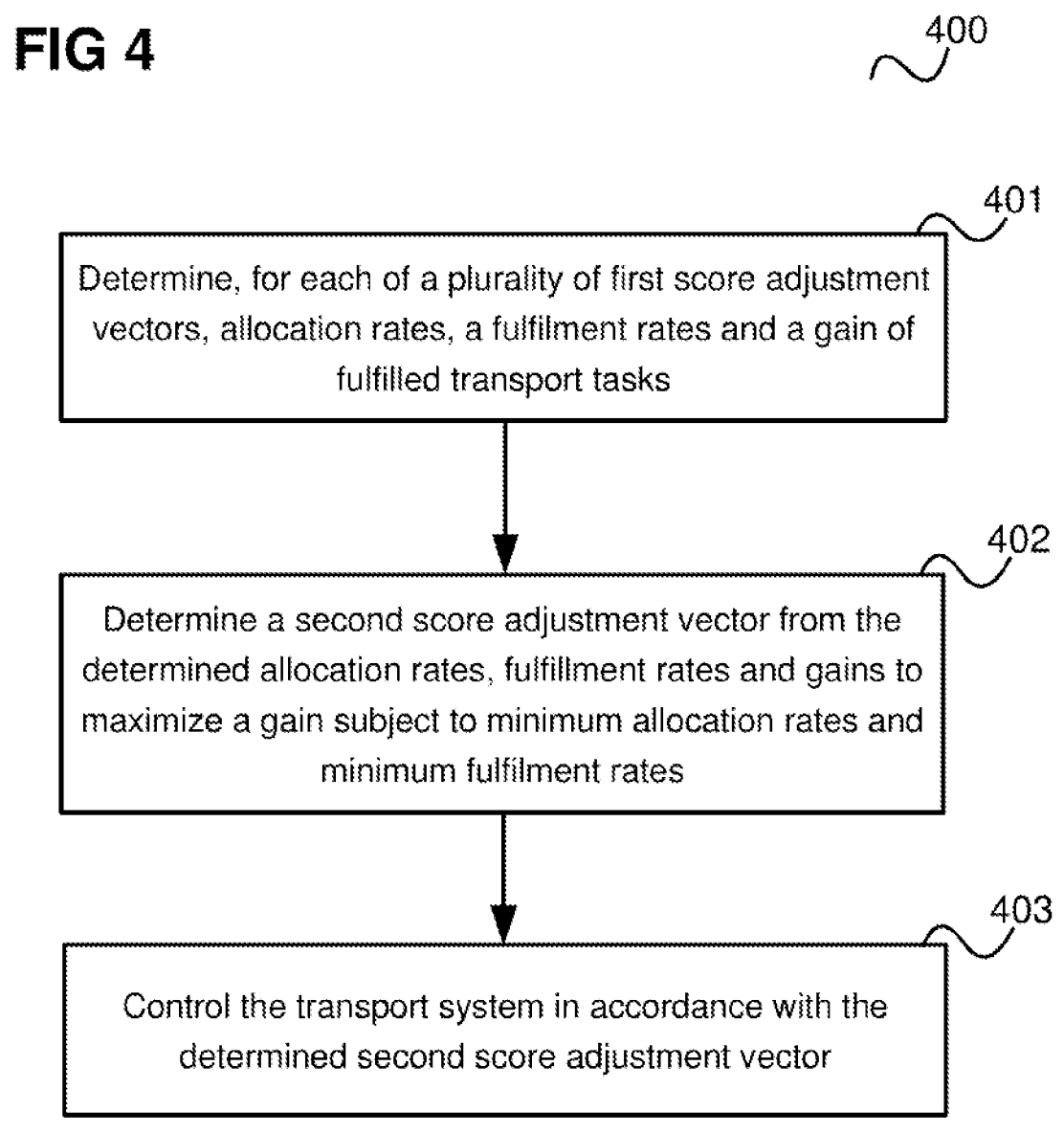

Determine, for each of a plurality of first score adjustment vectors, allocation rates, a fulfilment rates and a gain of fulfilled transport tasks

402

Determine a second score adjustment vector from the determined allocation rates, fulfillment rates and gains to maximize a gain subject to minimum allocation rates and minimum fulfilment rates

403

Control the transport system in accordance with the determined second score adjustment vector

METHOD AND DEVICE FOR CONTROLLING A TRANSPORT SYSTEM TO PERFORM TRANSPORT TASKS

This application is a US National Stage application pursuant to 35 USC 371 of International Application No. PCT/SG2022/050803, filed on Nov. 4, 2022, and claiming benefit of and priority to Singapore Application No. 10202112426V filed on Nov. 9, 2021, each of which is hereby incorporated by reference herein in their entirety.

TECHNICAL FIELD

Various aspects of this disclosure relate to methods and devices for controlling a transport system to perform transport tasks.

BACKGROUND

The quality of a transport service largely depends on the assignment of vehicles (or generally transport resources) to transport tasks. Transport tasks which are more important than others should be prioritised over transport tasks which are less important and fulfilment rate of transport tasks should be high overall.

While selecting a good assignment in such a context is already challenging, it gets even more challenging when vehicle supply is shared among multiple transport subsystems, e.g. a transport sub-system for food, a transport sub-system for (non-food) parcels and a transport subsystem for persons. In such a case scenario, one transport task may not only be more important than another, but one transport sub-system may in general be more important than another. For example, while it is usually acceptable that a parcel gets delayed by a couple of hours, this may not be the case for fresh food. A transport sub-system may also be preferred for strategic reasons.

However, it is usually also not desirable to simply prioritize one transport sub-system over another (i.e. one category of transport tasks, e.g. food, over another, e.g. parcels) since this may lead to a total neglect of one of the transport sub-systems, e.g. parcels getting delayed at an unacceptable level.

Therefore, approaches to control transport systems are desirable which allow fulfilling conditions like treating important tasks with priority, minimum allocation and fulfilment rates.

SUMMARY

Various embodiments concern a method for controlling a transport system comprising determining, for each first score adjustment vector of a plurality of first score adjustment vectors, wherein each first score adjustment vector comprises, for each transport task category of a plurality of transport task categories, a respective score adjustment value associated with the transport task category, an allocation rate of predetermined transport tasks for each transport task category, a fulfilment rate of predetermined transport tasks for each transport task category and a gain of fulfilled predetermined transport tasks, which are achieved if, for each predetermined transport task, scores reflecting costs and profit of predetermined transport tasks are adjusted according to the score adjustment value of the first score adjustment vector associated with the transport task category of the transport task and the transport system prioritizes predetermined transport tasks depending on their scores.

The method further comprises determining a second score adjustment vector, comprising, for each transport task category of the plurality of transport task categories, a respective score adjustment value associated with the transport task category, from the allocation rates, fulfilment rates and gains determined for the first score adjustment vectors by estimating the second score adjustment vector to maximize a gain of fulfilled requested transport tasks subject to a predetermined minimum allocation rate of requested transport tasks of each transport task category and a predetermined minimum fulfilment rate of requested transport tasks of each transport task category. Additionally, the method comprises controlling the transport system to perform transport tasks of a set of requested transport tasks by determining scores for each requested transport task, adjusting the scores of each transport task according to the score adjustment value associated with the transport task category of the second score adjustment vector and prioritizing requested transport tasks depending on their adjusted scores.

According to one embodiment, the second score adjustment vector is estimated by searching a score adjustment vector which maximizes the gain of fulfilled requested transport tasks while meeting the predetermined minimum allocation rate of requested transport tasks of each transport task category and the predetermined minimum fulfilment rate of requested transport tasks of each transport task category and which is achieved if the score of each requested transport task is adjusted according to the score adjustment value of the second score adjustment vector associated with the transport task category of the requested transport task and the transport system prioritizes requested transport tasks depending on their adjusted scores.

According to one embodiment, each score of a transport task is a score of performing the transport task with a respective transport resource of the transport system.

According to one embodiment, each score reflects a cost of performing the transport task with the respective transport resource for the transport system and a profit of performing the transport task with the respective transport resource for the transport system, wherein the profit is a profit relative to time required for the transport system to fulfil the transport task.

According to one embodiment, each score is a cost score and prioritizing transport tasks depending on adjusted scores comprises controlling the transport system to perform a transport task with a transport resource instead of performing another transport task with the transport resource, if the adjusted score of performing the transport task with the transport resource is lower than the adjusted score of performing the other transport task with the transport resource.

According to one embodiment, each score is a profit score and prioritizing transport tasks depending on adjusted scores comprises controlling the transport system to perform a transport task with a transport resource instead of performing another transport task with the transport resource, if the adjusted score of performing the transport task with the transport resource is higher than the adjusted score of performing the other transport task with the transport resource.

According to one embodiment, the method comprises determining the allocation rates of the predetermined transport tasks, the fulfilment rates of the predetermined transport tasks and the gain of fulfilled predetermined transport tasks, by operation of the transport system and/or by simulation.

According to one embodiment, the predetermined transport tasks are historical transport tasks of the transport system.

According to one embodiment, the predetermined allocation rate for each transport task category is given by a predefined percentage of an allocation rate for the transport task category achieved when disregarding profit when assigning transport resources of the transport system to the predetermined transport tasks and wherein the predetermined fulfilment rate for each transport task category is given by a predefined percentage of a fulfilment rate for the transport task category achieved when disregarding profit when assigning transport resources of the transport system to the predetermined transport tasks.

According to one embodiment, the predetermined allocation rate for each transport task category and the predetermined fulfilment rate for each transport task category are given by an operator strategy of the transport system.

According to one embodiment, the transport system comprises multiple transport sub-systems and each transport task category contains the transport tasks performed for a respective transport sub-system associated with the transport task category.

According to one embodiment, each transport sub-system handles transport of a respective type of goods, wherein different transport sub-systems handle different types of goods.

According to one embodiment, the types of goods comprise persons, fresh food and parcels (e.g. "express" and "non-express" as types).

According to one embodiment, the transport sub-systems share transport resources.

According to one embodiment, the method comprises determining the second score adjustment vector using Bayesian optimization or a Multi Armed Bandit algorithm.

According to one embodiment, the method comprises repeatedly updating the second score adjustment vector during operation of the transport system.

According to one embodiment, a transport system controller is provided configured to perform the method of one of the embodiments described above.

According to one embodiment, a computer program element is provided including program instructions, which, when executed by one or more processors, cause the one or more processors to perform the method of one of the embodiments described above.

According to one embodiment, a computer-readable medium is provided including program instructions, which, when executed by one or more processors, cause the one or more processors to perform the method of one of the embodiments described above.

BRIEF DESCRIPTION OF THE DRAWINGS

The invention will be better understood with reference to the detailed description when considered in conjunction with the non-limiting examples and the accompanying drawings, in which:

FIG. 4 shows a flow diagram illustrating a method for controlling a transport system.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
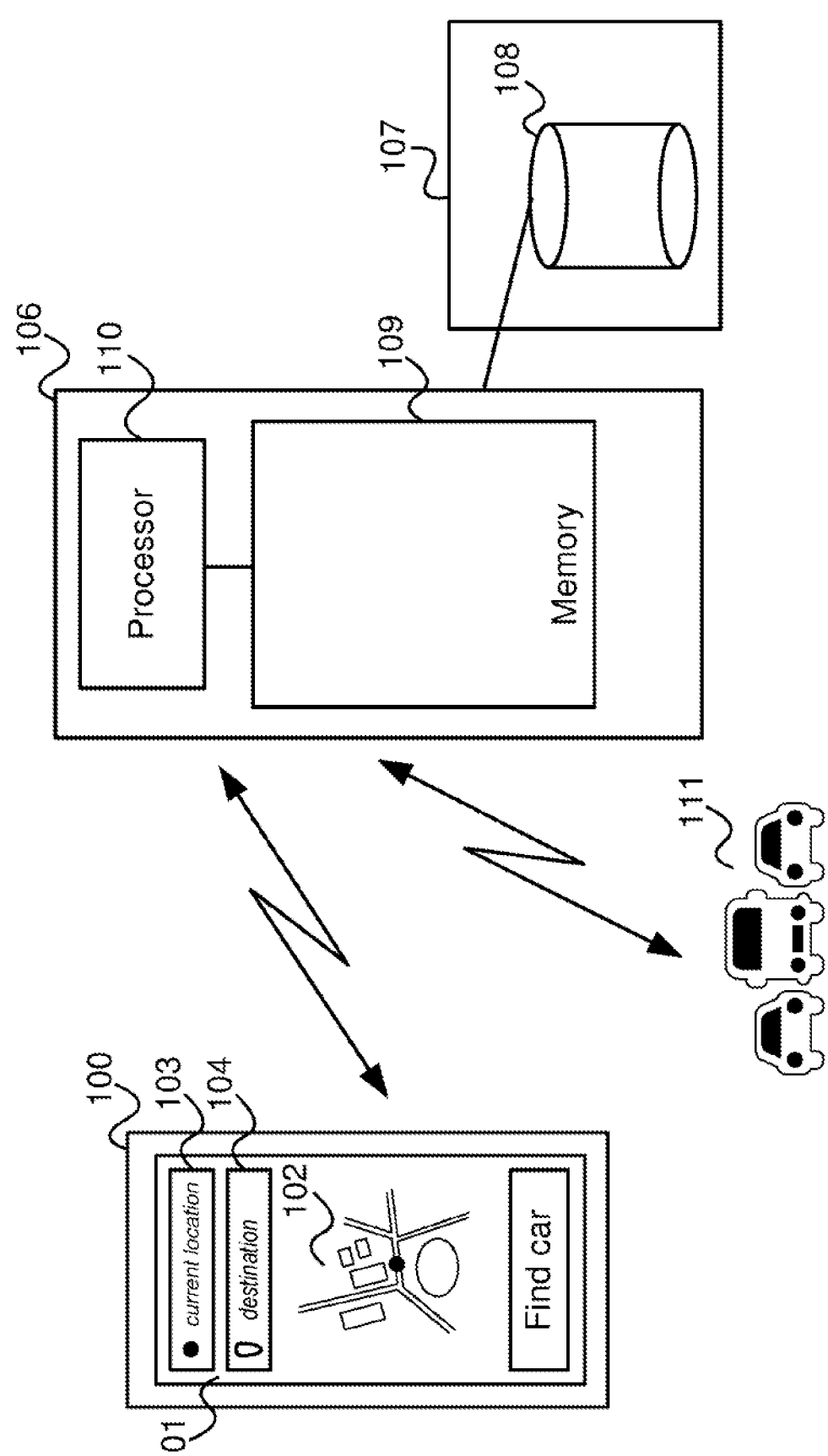
FIG. 1 shows a communication arrangement for usage of an e-hailing service including a smartphone and a server.

FIG. 1 shows a communication arrangement including a smartphone 100 and a server (computer) 106.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the vicinity of the user's position (which the app may determine based on a location service, e.g. a GPS-based location service). Further, the GUI 101 includes a box for point of departure 103 (which may be set to the user's present location obtained from location service) and a box for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with the server 106 of the e-hailing service via a radio connection. The server 106 may consult a memory 109 or a data storage 108 having information about the current location of registered vehicles 111, about when they are expected to be free, about traffic jams etc. From this, a processor 110 of the server 106 selects the most suitable vehicle (if available, i.e. if the request can be fulfilled) and provides an estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button. If the user accepts, the server 106 informs the selected vehicle 111 (or, equivalently, its driver), i.e. the vehicle the server 106 has allocated for fulfilling the transport request.

It should be noted while the server 106 is described as a single server, its functionality. e.g. for providing an e-hailing service for a whole city, will in practical application typically be provided by an arrangement of multiple server computers (e.g. implementing a cloud service). Accordingly, the functionality described in the following provided by the server 106 may be understood to be provided by an arrangement of servers or server computers.

The data storage 108 may for example be part of a cloud-based system 107 provided by a cloud storage provider to store and access data which it may use for taking decisions, such as information about the location of passengers and vehicles, their history (earlier bookings and routes taken) etc.

The server 106 together with the vehicles 111 provides the e-hailing service, i.e. forms a transport system.

However, the transport system may not only provide the e-hailing service, i.e. serve transport tasks for persons. Rather, the vehicles 111 may be shared among multiple transport sub-systems (i.e. verticals or other demand or order categories or types, resulting in a supply shared market from the transport system's operator point of view).

This means that in such a supply shared market, part of the vehicle (e.g. driver) supply is shared by different verticals, for example, bike drivers are shared between a food transport sub-system, a person transport sub-system and a (non-food) parcel transport sub-system. Different verticals have different profit distributions based on the maturity of the service associated with the respective transport sub-system. During a state of undersupply the transport system is unable to serve all transport tasks (e.g. bookings) and the transport system controller (e.g. server 106, e.g. performing a corresponding allocation algorithm) is configured to take into account a set of factors (such safety, estimated time of arrival, importance level of the person to be transported, etc.) to determine and prioritise transport tasks that should be served first.

For example, the operator may have a focus on profitability so profitability of the transport tasks may become a key factor to consider in this allocation scheme.

It should be noted that "profit" does not necessarily mean financial profit. This means that the profit of a (fulfilled) transport task for a transport system is not necessarily the amount of money the customer pays for the transport task (minus the cost) but may also be another measure of the transport task's worth. For example, each transport task may have an importance level associated with and the worth of the transport task (i.e. the profit for the transport system when fulfilling the transport task) is that importance level. For example, a trip to the airport may have a higher importance than a trip to a mall or a transport task for transporting a person may have a higher importance than a transport task for transporting a parcel since usually, it is worse if a person is delayed than a parcel. However, other factors may come into play like a parcel of medical supplies may in turn have a much higher importance level and thus a higher worth. So, fulfilling the transport task of transporting the parcel of medical supplies may lead to a higher profit than, for example, transporting an electronic entertainment device.

So, "profit" may be any gain that is based on any worth associated with a transport task. A gain of multiple transport tasks is a sum of gains of the transport tasks (wherein costs may also be deducted so this may be a net gain).

According to various embodiments, approaches for transport system control, in particular vehicle allocation, are provided which allow Taking into account that profit varies over transport sub-systems (e.g. over verticals): the definition of profitability is for example different for food and parcel transport and can be biased towards one. Verticals may also be less profitable since they are still growing but should nevertheless not be neglected.

Taking into account that effort of a transport task varies over transport sub-systems. For example, the given time taken between transport tasks can be vastly different for different business (e.g. loading in and out baggage of a person picked up at the airport takes longer than dropping a parcel in front of a door). Taking into account those factors allows for a fair comparison between multiple businesses.

Guaranteeing a target fulfilment rate: For each transport sub-system, a predetermined minimum fulfilment rate is respected. This avoids that, if profit is considered as a prioritisation factor, that fulfilment rate of transport sub-systems is neglected.

According to various embodiments, the above is achieved by a control (or transport resource allocation) scheme (or model) for a transport system with shared transport resources (e.g. vehicles, drivers, planes, trains etc.). According to various embodiments, it includes a unified profit measurement to ensure the fairness of allocation and efficiency (in terms of achieved profit). Specifically, according to various embodiments, the control scheme considers profit per unit time instead of total profit of transport task (e.g. booking or order). The control scheme takes into account variations of the profit distribution for different types of transport sub-systems (e.g. verticals), e.g. according to changing (operator) strategy, conditions and requirements. e.g. with respect to market (business) like seasonal changes, infrastructure, etc. According to various embodiments, to ensure that profit based allocation does not impact on the fulfilment rates of all the transport sub-systems, the transport system controller performs an online adjustment to auto-tune the prioritization with regard to such changes.

So, according to various embodiments, a unified profit measurement is defined and a control scheme is provided to maximize overall profit (i.e. from all transport sub-systems) while respecting the allocation rates and fulfilment rates for all the transport sub-systems.

Regarding unified profit measurement, according to various embodiments, a profit feature is used by the transport system controller as the measurement to compare the profit between different transport tasks. The profit feature not only considers the profit earned for a job, but also the effort taken for the vehicle to complete the job. The transport system controller for example uses the following equation to compute the profit score for a transport task:

$$\text{profit feature} = \text{profit/time}$$

Here the profit means the actual profit gained from the transport task and time includes the total time taken for the transport task, e.g. estimated time it takes to arrive, estimated time it takes to travel and other estimated necessary periods (e.g. time to pick-up a parcel, bringing a parcel from the vehicle to a customer, waiting, e.g. for a person to get in or to pay, etc.).

As mentioned above, a transport sub-system should not be neglected even though it is currently not profitable. Therefore, according to various embodiments, the control scheme is configured for handling the following three cases:

1. A vertical may still be growing and may not be as profitable as others. Therefore, the control scheme provides prioritization on vertical level to ensure that a profit-based allocation does not de-prioritize the transport tasks for this vertical too harshly (which may be against the operator's strategy to support the vertical).

2. With the development of such a prioritized vertical, the control scheme slowly reduces its prioritization or even removes its prioritization as the vertical may become sufficiently profitable and a profit-based allocation itself can provide a fair allocation for the vertical.

3. When the vertical has become even more profitable than the others, the control scheme may avoid that its transport tasks are prioritized over the other transport sub-systems. For example, the control scheme may prevent that another transport sub-system (e.g. a core vertical) gets affected too much (e.g. in terms of allocation rate and fulfilment rate).

To take these three cases into account, according to various embodiments, the control scheme performs transport resource allocation depending on a score adjustment value determined for each transport sub-system. The score adjustment values for all transport sub-systems together form a score adjustment vector. For example in the first case above, the control scheme may assign a high score adjustment value (e.g. "business factor") to the vertical depending on its overall profitability. In case 2, the control scheme may set this score adjustment value to 0 for all verticals and in case 3, the control scheme may set a certain score adjustment vector for the core vertical (i.e. the other transport sub-system).

The control scheme for example minimizes (if formulated in terms of cost) or maximizes (if formulated in terms of profit) a score function, wherein the score for a transport task includes a cost, i.e. expense (e.g. fuel cost) of the transport task, the profit feature and the score adjustment value.

An example with two transport tasks b1, b2 from a first transport sub-system (e.g. for a food transport service) and b3, b4 from a second transport sub-system (e.g. for a parcel transport service) and two vehicles d1, d2 is given in tables 1 to 3. It is formulated in terms of costs (i.e. the aim is to have score values which are as low as possible).

Table 1 gives a score including only costs for combinations of vehicles and transport tasks.

TABLE 1

|  | d1 | d2 |
|---|---|---|
| b1 | 100 | 500 |
| b2 | 300 | 300 |
| b3 | 500 | 100 |
| b4 | 300 | 300 |

Minimizing score using these values (i.e. disregarding income for taking over the transport tasks) would give the assignment d1→b1, d2→b3. This means that both transport sub-system would have 50% allocation rate.

Now, it is assumed that in terms of income, b3=b4>b2>b1 and it is assumed that corresponding values to represent this income adds 300 to b1, 50 to b2 and 0 to b3 and b4. The resulting scores (thus taking into account both income and expense) are as given in table 2.

TABLE 2

|  | d1 | d2 |
|---|---|---|
| b1 | 400 | 800 |
| b2 | 350 | 350 |
| b3 | 500 | 100 |
| b4 | 300 | 300 |

Minimizing the score using these score values would result in the assignment d1→b4, d2→b3. So, the second transport sub-system would have 100% allocation rate while the first transport sub-system would have 0%. Since this is not desirable, the transport system controller further takes into account score adjustment values.

It may learn these in such a way that the allocation rate change (from table 1 to table 2) is compensated, for example by online learning. In the present example, the transport system controller may have determined a score adjustment value of −75 to transport tasks of the first transport sub-system. Table 3 shows the resulting (adjusted) score values.

TABLE 3

|  | d1 | d2 |
|---|---|---|
| b1 | 325 | 725 |
| b2 | 275 | 275 |
| b3 | 500 | 100 |
| b4 | 300 | 300 |

Minimizing score using the scores of table 3 results in the assignment d1→b2, d2→b3. Thus, the transport system controller has achieved that the allocation rates for both transport sub-systems are at 50%. Moreover, d1 is allocated to a more profitable booking b2 instead of b4.

As conditions may change during operation of the transport system (e.g. strategy and surrounding environment), the transport system controller determines the score adjustment values automatically by a learning algorithm. There are two approaches for the automatic score adjustment: an online learning and optimisation framework and an offline simulation and optimisation framework. The offline simulation and optimisation results can be used to find the initial configuration for the online learning algorithm.

Online Learning and Adjustment Framework

In this approach, the learning algorithm keeps track of the allocation rates and fulfilment rates of all the verticals. Meanwhile, the overall score is also monitored in near real time for a current time period. Based on the computed signals, like allocation rate, fulfilment rate and score, a reward is computed and the online learning algorithm uses the reward to decide the adjustment values (here referred to as bf for "business factor") for all the verticals for the subsequent time period. The reward function can be expressed as:

$$\max_{bf_1,...,bf_N} : r = \sum_{i=1} P'_i(bf_i); i = 1, \ldots, N$$

$$\text{s.t. } A_i(bf_i) \geq A_i(\text{base})$$

$$F_i(bf_i) \geq F_i(\text{base})$$

where r is the reward function, which consists of all the normalised score values for all the verticals which can here be seen as profit values since the optimization is in this example formulated as a maximization. $A_i(bf_i)$ is the allocation rate for the ith vertical for business factor $bf_i$. N is the number of verticals. $F_i(bf_i)$ is the fulfilment rate for the ith vertical for business factor bf. The thresholds $A_i(base)$ and $F_i(base)$ are for example set depending on (e.g. set to a certain percentage of, which may be 100%) the allocation rate and fulfilment rate under normal conditions without using a profit based allocation algorithm.

To solve the above optimization problem, the transport system controller can divide the whole allocation bandwidth into slots, and can divide these slots into base group, optimal group and exploration group. It can use default (unadjusted) scores for the base group, scores adjusted by the optimized business factor (so far) for the optimal group and try score adjustment using different business factors for the exploration group to find whether better values exist. Slots can for example refer to time intervals. For example, a day is divided into 144 slots wherein each slot spans for 10 mins, and then these 144 slots are randomly distributed to different groups based on the ratio of allocation to the groups (for example, 10% exploration group, 40% optimal group and 50% for base group).

Here, the transport system controller may apply a Bayesian optimization algorithm to search for an optimum score adjustment vector.

The learning interval, i.e. the time from time interval to subsequent time interval can for example be a day or an hour depending on the requirements.

Figure 2:
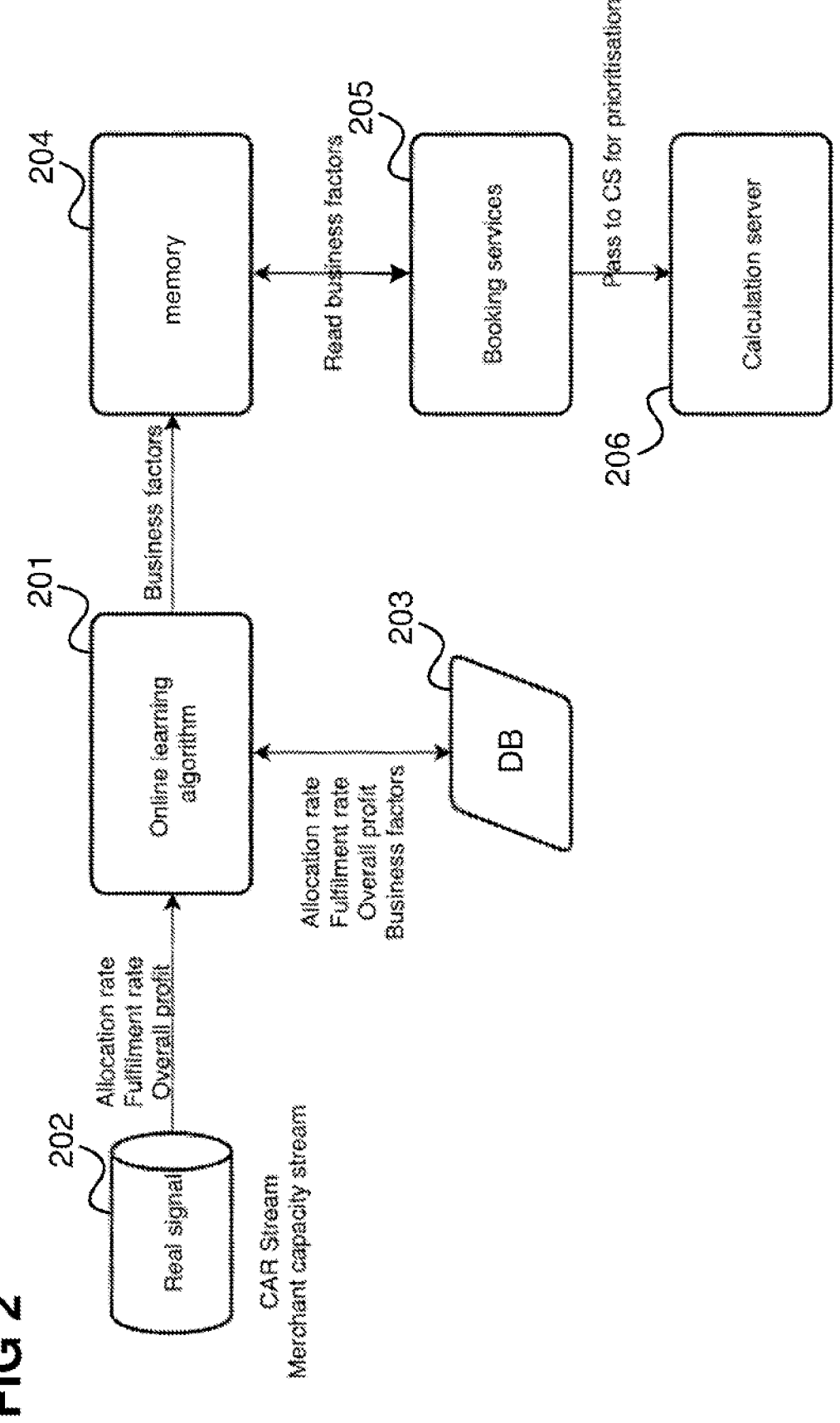
FIG. 2 illustrates score adjustment based on online learning.

FIG. 2 illustrates score adjustment based on online learning.

The transport system controller performs an online learning algorithm 201. It receives (current) real data 202 (i.e. from the operation of the transport system). This real data includes an allocation rate, a fulfilment rate and an overall profit (i.e. score, which is given in terms of profit in this example) that was achieved when operating the transport system with an adjustment vector (in the current time period). The transport system controller also maintains a data base 203 (e.g. corresponding to data storage 108) with historical real data (i.e. stores real data received for older time periods).

From the current real data 202 and the historical real data of data base 203 the online learning algorithm determines a score adjustment vector (e.g. "business factors") as described above and stores it in a score adjustment value memory 204. A booking service 205 executed by the transport system controller reads the score adjustment values and supplies them to a calculation service 206 which determines which transport tasks currently requested should be served (i.e. prioritized) and allocates vehicles to transport tasks accordingly.

Offline Simulation and Adjustment Framework

As mentioned above, another approach for automatic score adjustment is to perform a simulation offline based on historical transport tasks to find the optimal business factors for all the transport sub-systems. This approach may also be used in combination with the online learning and adjustment framework for providing an initial set up. The optimization problem can be defined similarly as the one in the online learning framework. In the offline case, the transport system controller can apply a MAB (Multi Armed Bandit) algorithm to find an adjustment score vector based on the allocation rate, fulfilment rate and overall profit.

Figure 3:
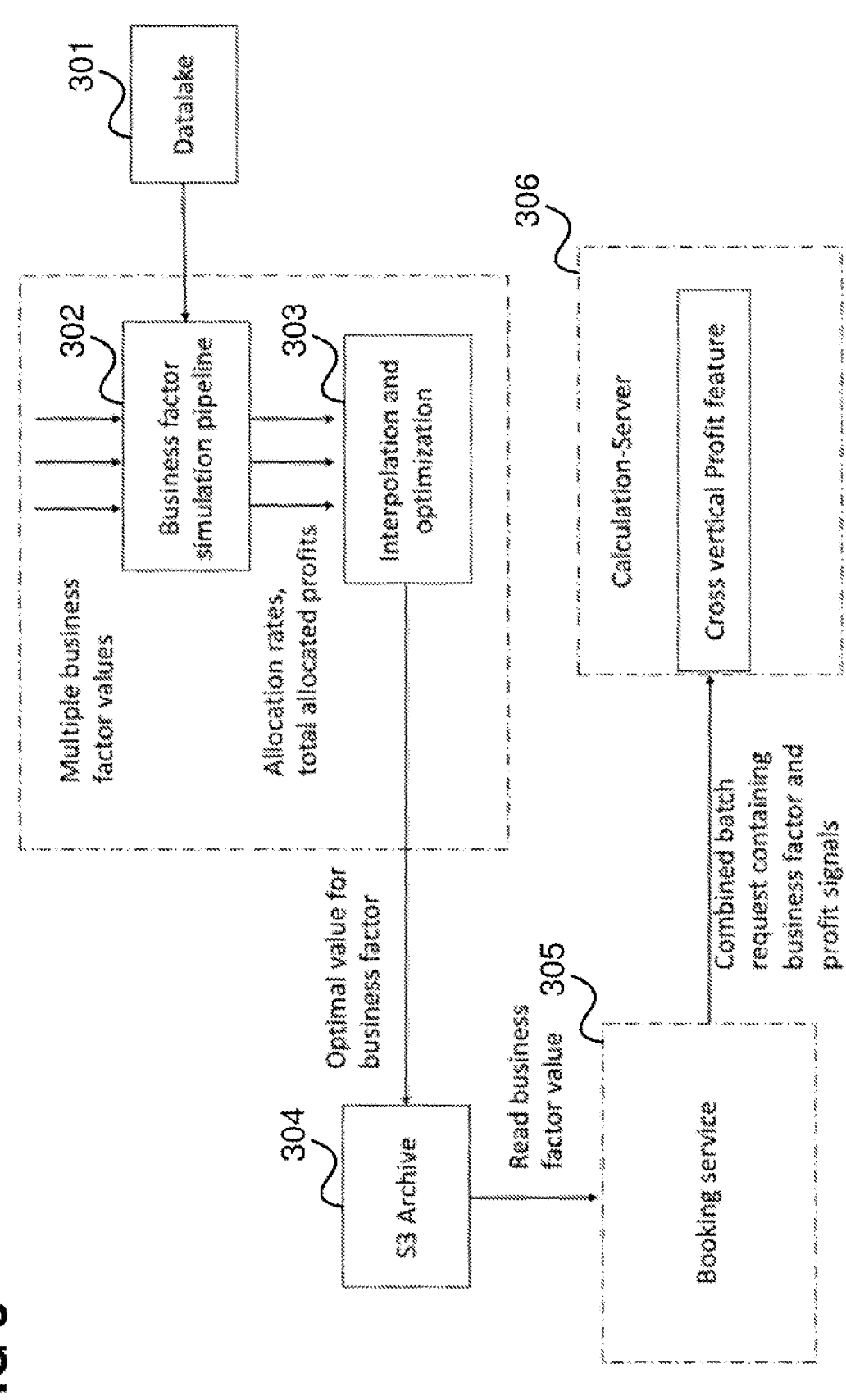
FIG. 3 illustrates score adjustment based on simulation.

FIG. 3 illustrates score adjustment based on simulation.

The transport system controller takes historical trip data from a data base 301. By means of a simulation pipeline 302, it determines, for various possible score adjustment vectors, the resulting performance indicators, i.e. allocation rate and fulfilment rate per transport sub-system and score (i.e. overall profit or overall cost depending on the objective formulation). From results of this evaluation of score adjustment vectors, the transport system controller determines, by interpolation and optimization 303, a score adjustment vector to be used and supplies and stores it in a score adjustment value memory 304. In operation, a booking service 305 executed by the transport system controller reads the score adjustment values and supplies them to a calculation service 306 which determines which transport tasks currently requested should be served (i.e. prioritized) and allocates vehicles to transport tasks accordingly.

The result of the optimization. i.e. the determined score adjustment vector, can be kept in memory and the transport system control may apply it to allocation of transport resources to transport tasks in a future period. The learning interval (at which the score adjustment vector is updated) can be in the range of months or weeks depending on the changes of the environment and, for example, business decisions.

Databases and memories may be implemented by cloud-based storages.

In summary, according to various embodiments, a method is provided as illustrated in FIG. 4.

FIG. 4 shows a flow diagram 400 illustrating a method for controlling a transport system.

In 401, for each first score adjustment vector of a plurality of first score adjustment vectors,
    an allocation rate of predetermined transport tasks for
        each transport task category,
    a fulfilment rate of predetermined transport tasks for each
        transport task category and
    a gain of fulfilled predetermined transport tasks.
are determined, which are achieved if, for each predetermined transport task, scores reflecting costs and profit of predetermined transport tasks are adjusted according to the score adjustment value of the first score adjustment vector associated with the transport task category of the transport task and the transport system prioritizes predetermined transport tasks depending on their scores.

Each first score adjustment vector comprises, for each transport task category of a plurality of transport task categories, a respective score adjustment value associated with the transport task category.

In 402, a second score adjustment vector is determined. Like the first score adjustment vectors it comprises for each transport task category of the plurality of transport task categories, a respective score adjustment value associated with the transport task category.

The second score adjustment vector is determined from the allocation rates, fulfilment rates and gains determined for the first score adjustment vectors by estimating the second score adjustment vector to maximize a gain of fulfilled requested transport tasks subject to a predetermined minimum allocation rate of requested transport tasks of each transport task category and a predetermined minimum fulfilment rate of requested transport tasks of each transport task category.

In 403 the transport system is controlled to perform transport tasks of a set of requested transport tasks by determining scores for each requested transport task, adjusting the scores of each transport task according to the score adjustment value associated with the transport task category of the second score adjustment vector and prioritizing requested transport tasks depending on their adjusted scores.

According to various embodiments, in other words, an assignment of vehicles (or generally transport resources) to transport tasks is performed by learning a relation between score adjustment vectors and gain and setting a score adjustment vector to maximize gain while respecting conditions for allocation rates and fulfilment rates for the various transport task categories (e.g. for various verticals).

An allocation rate of a transport task category is the ratio of transport resources which are allocated to transport tasks of the transport task category to all transport resources.

A fulfilment rate of a transport task category is the ratio of transport tasks of the transport task category which are fulfilled (i.e. served) to all (requested) transport tasks of the transport task category.

Figure 5:
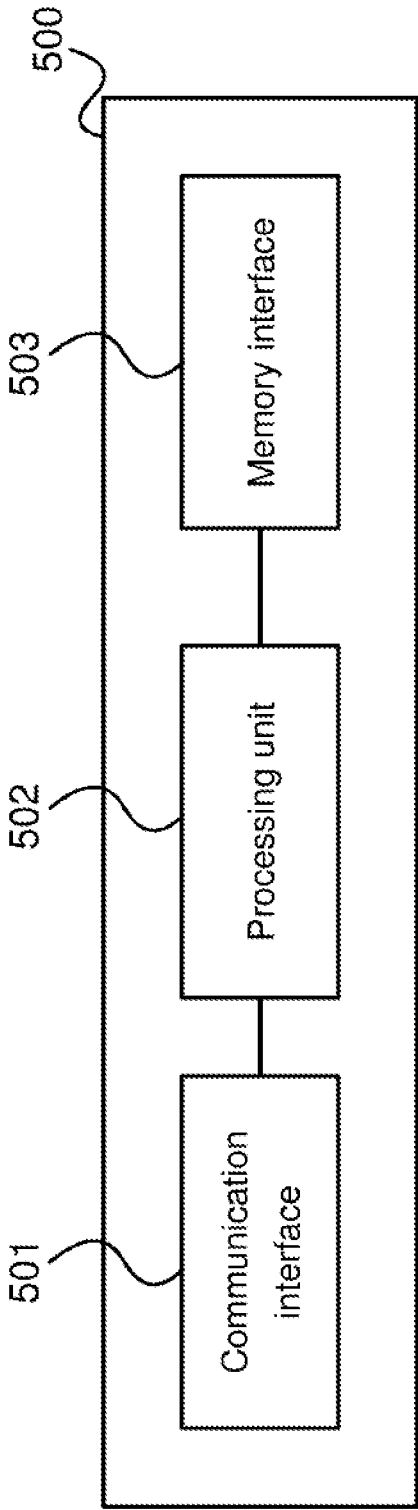
FIG. 5 shows a transport system controller according to an embodiment.

The method of FIG. 4 is for example carried out by a transport system controller as illustrated in FIG. 5.

FIG. 5 shows a transport system controller 500 according to an embodiment.

The transport system controller 500, e.g. implemented by a server computer, includes a communication interface 501 (e.g. configured to receive requests for transport tasks). The transport system controller 500 further includes a processing unit 502 and a memory 503. The memory 503 may be used by the processing unit 502 to store, for example, historical trip data or simulation data. The transport system controller 500 is configured to perform the method of FIG. 4. For example, the memory 503 stores program code which makes the transport system controller 500 perform the method of FIG. 4.

The transport resources may in particular include may be autonomous vehicles. Thus, the approach of FIG. 6 provides a control of a robotic system (including a plurality of robotic agents in the form of autonomous vehicles).

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor. e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for controlling a transport system, comprising:
   determining, by a transport system controller, for each first score adjustment vector of a plurality of first score adjustment vectors, wherein each first score adjustment vector comprises, for each transport task category of a plurality of transport task categories, a respective score adjustment value associated with the transport task category,
   an allocation rate of predetermined transport tasks for each transport task category,
   a fulfilment rate of predetermined transport tasks for each transport task category and
   a gain of fulfilled predetermined transport tasks,
   which are achieved if, for each predetermined transport task, scores reflecting costs and profit of predetermined transport tasks are adjusted according to the score adjustment value of the first score adjustment vector associated with the transport task category of the transport task and the transport system prioritizes predetermined transport tasks depending on their scores;
   determining, by the transport system controller, a second score adjustment vector, comprising, for each transport task category of the plurality of transport task categories, a respective score adjustment value associated with the transport task category, from the allocation rates, fulfilment rates and gains determined for the first score adjustment vectors by estimating the second score adjustment vector to maximize a gain of fulfilled requested transport tasks subject to a predetermined minimum allocation rate of requested transport tasks of each transport task category and a predetermined minimum fulfilment rate of requested transport tasks of each transport task category; and
   controlling, by the transport system controller, the transport system to perform transport tasks of a set of requested transport tasks by determining scores for each requested transport task, adjusting the scores of each transport task according to the score adjustment value associated with the transport task category of the second score adjustment vector, prioritizing requested transport tasks depending on their adjusted scores and communicating each prioritized transport task to a respective transport resource of the transport system.

2. The method of claim 1, wherein the second score adjustment vector is estimated by searching a score adjustment vector which maximizes the gain of fulfilled requested transport tasks while meeting the predetermined minimum allocation rate of requested transport tasks of each transport task category and the predetermined minimum fulfilment rate of requested transport tasks of each transport task category and which is achieved if the score of each requested transport task is adjusted according to the score adjustment value of the second score adjustment vector associated with the transport task category of the requested transport task and the transport system prioritizes requested transport tasks depending on their adjusted scores.

3. The method of claim 1, wherein each score of a transport task is a score of performing the transport task with a respective transport resource of the transport system.

4. The method of claim 3, wherein each score reflects a cost of performing the transport task with die respective transport resource for the transport system and a profit of performing the transport task with the respective transport resource for the transport system, wherein the profit is a profit relative to time required for the transport system to fulfil the transport task.

5. The method of claim 3, wherein each score is a cost score and prioritizing transport tasks depending on adjusted scores comprises controlling the transport system to perform a transport task with a transport resource instead of performing another transport task with the transport resource, if the adjusted score of performing the transport task with the transport resource is lower than the adjusted score of performing the other transport task with the transport resource.

6. The method of claim 3, wherein each score is a profit score and prioritizing transport tasks depending on adjusted scores comprises controlling the transport system to perform a transport task with a transport resource instead of performing another transport task with the transport resource, if the adjusted score of performing the transport task with the transport resource is higher than the adjusted score of performing the other transport task with the transport resource.

7. The method of claim 1, comprising determining the allocation rates of the predetermined transport tasks, the fulfilment rates of the predetermined transport tasks and the gain of fulfilled predetermined transport tasks, by operation of the transport system and/or by simulation.

8. The method of claim 1, wherein the predetermined transport tasks are historical transport tasks of the transport system.

9. The method of claim 1, wherein the predetermined allocation rate for each transport task category is given by a predefined percentage of an allocation rate for the transport task category achieved when disregarding profit when assigning transport resources of the transport system to the predetermined transport tasks and wherein the predetermined fulfilment rate for each transport task category is given by a predefined percentage of a fulfilment rate for the transport task category achieved when disregarding profit when assigning transport resources of the transport system to the predetermined transport tasks.

10. The method of claim 1, wherein the predetermined allocation rate for each transport task category and the predetermined fulfilment rate for each transport task category fire given by an operator strategy of the transport system.

11. The method of claim 1, wherein the transport system comprises multiple transport sub-systems and each transport task category contains the transport tasks performed for a respective transport sub-system associated with the transport task category.

12. The method of claim 11, wherein each transport sub-system handles transport of a respective type of goods, wherein different transport sub-systems handle different types of goods.

13. The method of claim 12, wherein the types of goods comprise persons, fresh food and parcels.

14. The method of claim 11, wherein the transport sub-systems share transport resources.

15. The method of claim 1, comprising determining the second score adjustment vector using Bayesian optimization or a Multi Armed Bandit algorithm.

16. The method of claim 1, comprising repeatedly updating the second score adjustment vector during operation of the transport system.

17. A transport system controller comprising:

a processing unit;

a communication interface operably connected to the processing unit; and a memory operably connected to the processing unit, wherein the memory stores program code which when executed cause the processing unit to:

determine, for each first score adjustment vector of a plurality of first score adjustment vectors, wherein each first score adjustment vector comprises, for each transport task category of a plurality of transport task categories, a respective score adjustment value associated with the transport task category, an allocation rate of predetermined transport tasks for each transport task category, a fulfilment rate of predetermined transport tasks for each transport task category and a gain of fulfilled predetermined transport tasks, which are achieved if, for each predetermined transport task, scores reflecting costs and profit of predetermined transport tasks are adjusted according to the score adjustment value of the first score adjustment vector associated with the transport task category of the transport task and the transport system prioritizes predetermined transport tasks depending on their scores;

determine a second score adjustment vector, comprising, for each transport task category of the plurality of transport task categories, a respective score adjustment value associated with the transport task category, from the allocation rates, fulfilment rates and gains determined for the first score adjustment vectors by estimating the second score adjustment vector to maximize a gain of fulfilled requested transport tasks subject to a predetermined minimum allocation rate of requested transport tasks of each transport task category and a predetermined minimum fulfilment rate of requested transport tasks of each transport task category; and control the transport system to perform transport tasks of a set of requested transport tasks by determining scores for each requested transport task, adjusting the scores of each transport task according to the score adjustment value associated with the transport task category of the second score adjustment vector, prioritizing requested transport tasks depending on their adjusted scores and communicating each prioritized transport task to a respective transport resource of the transport system.

18. A non-transitory computer-readable medium comprising program instructions, which, when executed by one or more processors, cause the one or more processors to:

determine, for each first score adjustment vector of a plurality of first score adjustment vectors, wherein each first score adjustment vector comprises, for each transport task category of a plurality of transport task categories, a respective score adjustment value associated with the transport task category, an allocation rate of predetermined transport tasks for each transport task category, a fulfilment rate of predetermined transport tasks for each transport task category and a gain of fulfilled predetermined transport tasks, which are achieved if, for each predetermined transport task, scores reflecting costs and profit of predetermined transport tasks are adjusted according to the score adjustment value of the first score adjustment vector associated with the transport task category of the transport task and the transport system prioritizes predetermined transport tasks depending on their scores;

determine a second score adjustment vector, comprising, for each transport task category of the plurality of transport task categories, a respective score adjustment value associated with the transport task category, from the allocation rates, fulfilment rates and gains determined for the first score adjustment vectors by estimating the second score adjustment vector to maximize a gain of fulfilled requested transport tasks subject to a predetermined minimum allocation rate of requested transport tasks of each transport task category and a predetermined minimum fulfilment rate of requested transport tasks of each transport task category; and control the transport system to perform transport tasks of a set of requested transport tasks by determining scores for each requested transport task, adjusting the scores of each transport task according to the score adjustment value associated with the transport task category of the second score adjustment vector, prioritizing requested transport tasks depending on their adjusted scores and communicating each prioritized transport task to a respective transport resource of the transport system.

\* \* \* \* \*